United States Patent Office 3,682,621
Patented Aug. 8, 1972

3,682,621
METHOD OF PRODUCING SPONGE-IRON PELLETS FROM HEMATITIC ALUMINA-CONTAINING IRON ORE
Georg von Struve, Neu Isenburg, and Fred Cappel, Sprendlingen, Germany, assignors to Metallgesellschaft Aktiengesellschaft, Frankfurt, Germany
No Drawing. Filed May 4, 1970, Ser. No. 34,629
Claims priority, application Germany, May 3, 1969, P 19 22 687.0
Int. Cl. C21b 1/08
U.S. Cl. 75—3   10 Claims

ABSTRACT OF THE DISCLOSURE

A method of producing sponge-iron pellets from aluminum-oxide-containing hematitic iron ore in which pellets are formed by combining the alumina-containing iron ore with appropriate binders, moisture etc. and sufficient alkaline-earth metal oxides, hydroxides and carbonates to attain a degree of basicity B between 0.6 and 0.8. The pellets are thereafter burned at a temperature of 1250° C. to 1320° C. and subjected to direct reduction in a shaft-type furnace with reducing gases. The product is iron sponge or molten iron. The degree of basicity B is defined as the sum of the basic oxides, hydroxides and carbonates (in molar terms) divided by the sum of the acid components including silica, silicates and silicic "acid" or oxidic compounds on the one hand and alumina and aluminates on the other.

FIELD OF THE INVENTION

Our present invention relates to a method of producing sponge-iron pellets and, more particularly, to a method of producing sponge-iron pellets from hematitic iron ores containing aluminum oxide.

BACKGROUND OF THE INVENTION

While recent developments in metallurgy, especially the metallurgy of iron and steel have led to increasing use of preliminary pelletization of iron ores or iron-ore concentrates, and the treatment of the resulting pellets in so-called "direct reduction" furnaces, i.e. furnaces in which the reduction of the iron oxides to metallic iron is carried out by a gas/solid reaction in which the pellets are treated with a reducing gas (e.g. a gas rich in carbon monoxide and/or hydrogen), numerous problems have been encountered.

One of these problems is the compressive strength of the pellets which, if insufficient, leads to crumbling and stratification of fine particles within the reducing furnace, thereby obstructing flow of the reducing gas therethrough and loss of thermal energy. Such crumbling may occur during the preparation of the pellets, in transport, in charging of the direct-reduction furnace, or upon the stacking of additional charges upon an existing bed of such pellets.

Other disadvantages arise when attempts are made to increase the compressive strength of the pellets and, indeed, most of the prior-art efforts to improve the ability of the pellets to withstand crumbling have decreased the porosity of the pellets or increased their density so as to render them less amenable to direct reduction by a reducing gas. The problem has been found to be especially acute with hematitic iron ores.

OBJECTS OF THE INVENTION

It is, therefore, the principal object of the present invention to provide an improved process for producing sponge-iron pellets from hematitic iron ores.

It is another object of the invention to provide a method of directly reducing hematitic iron ores to sponge iron which avoids the difficulties hitherto encountered with pellets of low compressive strength and/or inefficient reducing capability.

SUMMARY OF THE INVENTION

These objects are attained, in accordance with the present invention, by a method of directly reducing hematitic iron ores containing alumina which is based upon our discovery that the disadvantages hitherto encountered can be eliminated entirely if the hematitic iron ore containing alumina (i.e. aluminum oxide in the form of $Al_2O_3$ or aluminates) has its basicity brought to a narrow range of 0.6 to 0.8 by the addition of basic compounds, especially the oxides, hydroxides and carbonates of alkaline-earth metals.

It has long been recognized that iron ores may be more or less acidic, depending upon the content of alumina silica, silicates and silicic acid therein. We have now found, however, that with the specific type of iron ore described above, there exists a narrow and critical range of basicity, hereinafter defined in terms of the degree of basicity B, which establishes the operative limits wherein hematitic iron, containing alumina (at least, say, 0.25%), can be used effectively in a direct-reducing furnace without crumbling as indicated earlier, and without resistance to direct reduction; in fact, there are indications that the rate of reduction may increase.

The degree of basicity, according to the present invention, is defined by the relationship $$B = \frac{\Sigma[b]}{\Sigma[a]}$$

wherein $\Sigma$ represents summation, and $b$ represents basic components while $a$ represents acid components. B must, in accordance with the present invention, be adjusted to a value between 0.6 and 0.8. We have found, moreover, that the acid components $a$ include silica ($SiO_2$) and alumina ($Al_2O_3$), as previously noted and of the basic compounds $b$, reference may be made to calcium compounds such as CaO and magnesium compounds such as MgO. When dealing with alumina-containing hematitic iron ores, the degree of basicity B can be given in terms of the weight ratio of the principal basic components, calcium oxide and magnesium oxide, and the acid components silica and alumina, to the exclusion of other compounds which may have acidic or basic properties, in consequence of the fact (apparently) that these components dominate the characteristics of the pellets. Hence the degree of basicity $$B = \frac{CaO + MgO}{SiO_2 + Al_2O_3}$$

According to a more specific feature of this invention, alumina-containing hematitic iron ore is formed into generally spherical pellets of a diameter 9 to 15 mm. by a roll-type pelletizing system and, prior to pelletization or during pelletization, is combined with alkaline-earth metal oxides, hydroxides or carbonates (preferably calcium oxides, calcium hydroxide, calcium carbonate, magnesium oxide, magnesium hydroxide or magnesium carbonate) in such quantity as to bring the degree of basicity $$B = \frac{CaO + MgO}{SiO_2 + Al_2O_3}$$

within the inclusive range of 0.6 to 0.8. We have discovered, moreover, that, after pelletization under these conditions, the pellets should be fired (burned) at a temperature in the relatively narrow range of 1250° C. to 1320° C. preparatorily to use in a direct reduction furnace. The invention also comprises the step of directly reducing the pellets in an upright or shaft-type furnace by passing upwardly through the pellets a reducing gas rich in hydrogen and/or carbon monoxide while the pellets are stacked in a columnar bed within this furnace. Advantageously, the degree of basicity lies between 0.70 and 0.75, the addition of the alkaline-earth oxides, hydroxides and carbonates being adjusted accordingly.

We have discovered, most surprisingly, that the establishment of this degree of basicity provides, by comparison with ordinary pellets of the same basic material obtained with the natural basicity or processed without altering the degree of basicity, a negligent tendency to swell (a maximum of 16% by volume) as contrasted with a volume change say, 50% with the pellets outside the present invention. Such large volume changes are manifested in a breakdown of the pellet structure, a sloughing of the comminuted material and the blockage of the interstices of the pellet mass. The degree of basicity is brought to the indicated level without materially reducing the iron content of the pellets which may remain within a preferred value of 65 to 66% calculated as Fe, in spite of the fact that an additive is provided to improve the physical properties of the pellets. The burning temperature (firing temperature) of the pellets of the present invention also lies some 50° to 80° C. below the firing temperature of earlier pellets without the addition of basic material.

According to still another feature of this invention, the green pellets are dried, before firing in a static state, i.e. without relative movement of the pellets and their support, e.g. upon a drying belt. To increase both the green strength and dry strength of the pellets, approximately 1% by weight of bentonite may be incorporated therein in accordance with conventional procedures, as a binder. At least 65 to 85% of the particles making up the pellets (iron oxide) should have a particle size below 35 microns. The pellets, according to the present invention, are subjected to gas-phase (i.e. direct) reduction in a shaft-type furnace for the production of sponge iron. When the pellets are used as a charge for a shaft furnace in the production of sponge iron, however, another advantage is gained in that the pellets remain sufficiently porous to permit encient reduction, but have a reduced surface-area-to-volume ratio (specific area) and are therefore less susceptible to reoxidation.

SPECIFIC EXAMPLE

An aluminum-oxide hematitic iron ore containing 65.2% by weight total iron (as iron oxide), 1.4% $Al_2O_3$ and 1.9% $SiO_2$ (heat loss=3.1%) is comminuted to the following particle size distribution (by volume):

0.2% over 0.2 mm.
1.0% over 0.09 mm.
5.4% over 0.063 mm.
9.8% over 0.045 mm.
16.8% over 0.033 mm.
66.8% smaller 0.033 mm.

Tests were made with the addition of 0, 1, 3, 4, 5% limestone, by weight in the form of a meal to the comminuted material so that, for the several tests, the degree of basicity was 0.0, 0.2, 0.6, 0.72 and 0.80, respectively.

Each of the specimens was formed into pellets of a particular size of 9 to 15 mm. diameter (spheroids) dried, burned and cooled over a total period of 41 minutes. The maximum firing temperature of 1300° C. was maintained for 11.7 minutes. The fired pellets were reduced in a shaft-type furnace for a period of 60 minutes with a gas mixture consisting of 60% by volume nitrogen and 40% by volume carbon monoxide. The degree of reduction was ascertained by measurement of oxygen loss (weight loss), the swelling ratio in percent was obtained by measurement of the linear dimensions of the pellets, the compressive strength of the pellets was obtained by a standard test using compression of the pellets between two steel plates. The results of the tests are given in the following table:

| Test No.: | $CaCO_3$ in percent | Degree of basicity B | Degree of reduction in percent | Volumetric swelling in percent | Compressive strength in kg. per pellet |
|---|---|---|---|---|---|
| 1 | | 0.0 | 56 | 24.4 | 22 |
| 2 | 1 | 0.20 | 38 | 23.5 | 13 |
| 3 | 3 | 0.60 | 58 | 17.3 | 39 |
| 4 | 4 | 0.72 | 56 | 12.0 | 72 |
| 5 | 5 | 0.80 | 60.3 | 10.2 | 125 |

In the range B=0.6 to 0.8, the volumetric swelling remains well below 18% while the degree of reduction is acceptable. At lower basicity, the degree of reduction falls with a sharp drop in compressive strength and increase in swelling. When pellets with a degree of basicity, made as above, between 0.7 and 0.75 were introduced into a direct reduction furnace and subjected to gas reduction with a mixture containing hydrogen and carbon monoxide, practically no problems were encountered with pellet deterioration or reoxidation.

We claim:
1. A method of producing sponge-iorn pellets comprising the steps of:
   (a) comminuting an aluminum oxide containing hematitic iron ore;
   (b) adjusting the degree of basicity B of said comminuted iron ore to a value between 0.6 and 0.8 by the addition of at least one alkaline-earth oxide, hydroxide or carbonate thereto and pelletizing the ore to produce pellets having said degree of basicity, said degree of basicity B being defined by the sum of the concentration of alkaline-earth oxides, hydroxides and carbonates in terms of the alkaline-earth oxide in said pellets divided by the sum of the concentrations of silica and alumina therein;
   (c) firing said pellets at a temperature between 1250° C. and 1320° C.; and
   (d) direct-reducing the fired pellets to sponge-iron pellets.
2. The method defined in claim 1 wherein said degree of basicity B=0.70 to 0.75 in said pellets.
3. The method defined in claim 1 wherein limestone is added to said ore in the formation of said pellets to establish said degree of basicity.
4. The method defined in claim 3 wherein said ore is comminuted in step (a) to a particle-size distribution such that 65 to 85% by weight is below a particle size of 33 microns.
5. The method defined in claim 4 wherein said sponge-iron pellets have a diameter of substantially 9 to 15 mm., a volumetric swelling of less than 18 and a compressive strength of at least 20 kg. per pellet.
6. The method defined in claim 5 wherein said fired pellets are reduced in step (d) by contacting them in a columnar bed with a reducing gas consisting at least in part of hydrogen or carbon monoxide.
7. The method defined in claim 6, further comprising the step of drying the pellets made in step (b) between steps (b) and (c).
8. The method defined in claim 7, further comprising the step of adding approximately 1% by weight of bentonite to said ore before or during the pelletization thereof.
9. The method defined in claim 8 wherein said ore contains at least 0.25% by weight alumina.
10. The method defined in claim 9 wherein said pellets each contain 65 to 66% by weight iron.

(References on following page)

References Cited

UNITED STATES PATENTS

| | | | |
|---|---|---|---|
| 2,028,105 | 1/1936 | Head | 75—3 X |
| 2,668,105 | 2/1954 | De Jahn | 75—3 X |
| 2,743,172 | 4/1956 | De Vaney | 75—3 |
| 3,189,436 | 6/1965 | Burstlein | 75—3 X |
| 3,205,063 | 9/1965 | Franklin et al. | 75—3 |
| 3,214,263 | 10/1965 | O'Connor | 75—3 |
| 3,295,957 | 1/1967 | Robertson | 75—3 X |
| 3,338,705 | 8/1967 | Meyer et al. | 75—3 |
| 3,428,445 | 2/1969 | Rausch et al. | 75—3 |
| 3,433,625 | 3/1969 | Schenck et al. | 75—5 |
| 3,556,774 | 1/1971 | Brunner | 75—34 X |

FOREIGN PATENTS

| | | | |
|---|---|---|---|
| 14,059 | 9/1962 | Japan | 75—34 |

ALLEN B. CURTIS, Primary Examiner

U.S. Cl. X.R.

75—34